United States Patent [19]

Tuphorn et al.

[11] 4,150,199
[45] Apr. 17, 1979

[54] PRECURSOR FOR AN ELECTRICAL STORAGE LEAD BATTERY

[75] Inventors: Hans Tuphorn; Horst Schmitt, both of Budingen, Fed. Rep. of Germany

[73] Assignee: Accumulatorenfabrik Sonnenschein GmbH, Fed. Rep. of Germany

[21] Appl. No.: 902,349

[22] Filed: May 3, 1978

[30] Foreign Application Priority Data

May 5, 1977 [DE] Fed. Rep. of Germany ....... 2720250

[51] Int. Cl.$^2$ ............................................. H01M 6/32
[52] U.S. Cl. .................................... 429/118; 429/204; 429/225; 429/247
[58] Field of Search ................ 429/118, 204, 225–228, 429/247

[56] References Cited

U.S. PATENT DOCUMENTS

| 1,405,627 | 2/1922 | Petrie | 429/247 X |
| 1,879,562 | 9/1932 | Smith | 429/247 X |
| 3,328,208 | 6/1967 | Ryhiner et al. | 429/204 X |
| 3,765,942 | 10/1973 | Jacke | 429/225 X |

*Primary Examiner*—Charles F. LeFevour
*Attorney, Agent, or Firm*—Shlesinger, Fitzsimmons & Shlesinger

[57] ABSTRACT

The invention relates to a precursor for an electrical storage lead battery which can be converted into an operative storage battery by the mere addition of a sulphuric acid electrolyte. This precursor which has an unlimited shelf life consists of positive plates, of negative plate dispersed therebetween and of separator plates inserted between adjacent positive and negative plates and of a housing encasing the plates in dry condition. These separator plates consist of a densely compressed compact containing (a) 70 to 100% of pulverized silicon-dioxide or of another pulverized material which is capable of absorbing the liquid electrolyte and of being converted thereby into a pressure-resistant gel and (b) 0 to 30% of fibres of glass or any other acid-resistant and oxidation-resistant material.

9 Claims, 1 Drawing Figure

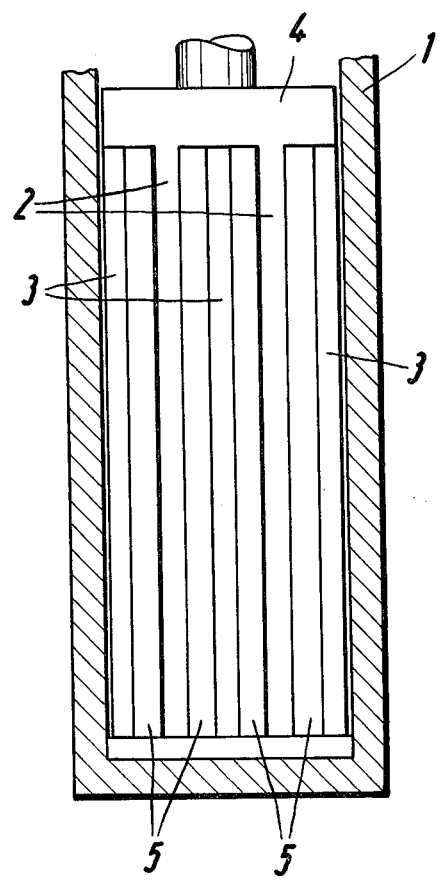

PRECURSOR FOR AN ELECTRICAL STORAGE LEAD BATTERY

BACKGROUND OF THE INVENTION

1. Field of the Invention

This invention relates to a precursor for an electrical storage battery comprising in a housing a plurality of positive plates, a plurality of negative plates dispersed therebetween and of separator plates inserted between adjacent positive and negative plates, all of the plates within the housing being in a perfectly dry condition wherefrom a practically unlimited shelf life of this article results. This article can be converted into an operative electrical storage lead battery by the mere introduction into the housing of a liquid sulphuric acid electrolyte.

It is an important feature of our invention that each separator is a densely compressed dry compact consisting substantially of a silica of the type which, when soaked with a sulphuric acid electrolyte, will undergo a drastic change of its consistency by conversion into a gel of a strength enabling it to properly act as a separator. This strength may be enhanced by fibres embedded in the gel. These gel separators are in intimate contact with the positive and negative plates of the finished operative battery.

2. Description of the Prior Art

U.S. Pat. No. 3,085,126 to Labino discloses a battery in which the separators inserted between the positive and negative plates consist of (a) 5 to 10% of coloidal silica or coloidal alumina and 85 to 95% of glass fibres. This mixture forms a porous body permeable to the electrolyte as distinguished from our novel separator forming a gel rather than a porous body. This gel has a strength and rigidity sufficient to hold the positive and negative plates in spaced relationship in which a shortcircuit between the plates cannot be formed. Moveover, this gel absorbs all of the liquid electrolyte this eliminating the risk that, if the battery should be accidentally turned upside down, it will lose liquid acid giving rise to corrosion and other trouble.

Operative electrical storage batteries of this kind are known per se; see U.S. Pat. No. 3,172,782 to Jache disclosing an operative storage battery in which the separators between the positive and negative plates contain a silica gel reinforced by embedded mats of glass fibre. These separators, however, are not formed by soaking a highly compressed compact of a silica-containing material with the liquid electrolyte. As distinguished from the precursor to which the present invention relates, the precursor of this prior battery is a housing containing the positive plates, the negative plates and the glass fibre mats therebetween. This precursor is converted into the operative storage battery by introducing a thixotropic gel liquified by agitation into the housing of the precursor. Liquifying this gel and filling it into the housing is a timeconsuming and difficult operation which is avoided by our invention which permits the liquid sulphuric acid electrolyte to be simply poured into the battery housing.

OBJECTS OF THE INVENTION

It is the object of the present invention to provide a precursor of an electrical storage battery which, by simply introducing a liquid sulphuric acid electrolyte, can be readily converted into a battery of the type having separators formed by a silica gel which has a strength sufficient to hold the battery plates in spaced relationship thus preventing any shortcircuit from forming and is capable of absorbing practically all of the liquid electrolyte thus preventing the battery, if it should be accidentally turned upside down, from losing liquid acid. The gel may be reinforced by embedded fibres of glass or of any other acid-resisting and non-corrosive material.

It is another object of the present invention to provide a precursor for an electrical storage battery which may be readily converted into an operative storage battery of high re-cycling life i.e. a battery capable of being discharged and recharged a great number of times.

SUMMARY OF THE INVENTION

We attain these objects by equipping the battery precursor with separators consisting of a densely compressed compact containing (a) 70 to 100% of a material capable, when soaked with a liquid electrolyte, of forming a pressure resistant gel.

(b) 0 to 30% of acid-resistant and oxidation-resistant fibres.

Preferably this material is finally divided silica, i.e. silicon dioxide. The separators may completely fill the space between the adjacent positive and negative plates of opposite polarity to thereby ensure that upon conversion of the precursor into the operative battery the silica gel will be in intimate contact with the positive and negative plates.

It is to be clearly understood that when our novel precursor is converted into an operative battery, the consistency of the separators will change from the solid condition into the gel condition. We prefer to limit the quantity of the liquid electrolyte filled into the housing for the purpose of converting our novel precursor into an operative battery to such an amount of liquid as will be completely absorbed by the separators whereby the operative battery will be free of any loose liquid electrolyte which might escape from the housing in event the battery should be accidentally turned upside down. We have found that a finely divided silica having a particle size of from 0.01 to 0.02 microns will result in a suitable gel when soaked with the electrolyte. A suitable silica of the required purity can be obtained by pyrolysis of silicon tetrachloride in a hydrogen oxygen flame.

Where the battery to be produced from our novel precursor shall be resistant to rough handling, we prefer to re-inforce the gel separator with embedded fibres of an acid-resistant and oxidation-resistant material such as glass. This re-inforcement will give the separators an increased strength and rigidity. The quantity of the fibres may amount of 3 to 30% by weight of the total weight of the separator compact. Preferably it amounts to 7 to 15%. The fibres may have a length of from 2 to 5 mm and a thickness of 1 to 10 denier. A lead separator produced from our novel precursor will not lose any electrolyte when turned upside down accidentally even if the conventional perforated plugs are used for closing the filling aperture of the housing, because of the absence of any free liquid electrolyte left in the housing after the electrolyte will have been absorbed by the gel, nor will the battery lose any of its electrolyte in event of a fracture of the housing.

The quantity of the liquid electrolyte that can be absorbed by the gel of the separator depends on, and increases with, the silica concentration in the gel formed. A high silica concentration has a favorable effect on the re-cycling life of the accumulator, i.e. on the number of possible recharging operations of the discharged battery.

Our invention is of particular advantage for batteries of the type requiring no service. Where a starter battery of the non-service type provided with negative plates having grids of an alloy free of antimony is accidentally completely discharged, for instance by the driver's failure to cut off the head lights, this will damage the battery causing the same in its early stage of operation to lose part of its capacity and in its advanced stage of operation to lose an extremely large quantity of its grid-filling material of the negative plates resulting in a complete destruction of the battery.

The battery produced from our novel precursor, however, will survive a considerable number of complete discharges, particularly, where the electrolyte consists of sulphuric acid to which a small percentage of phosphoric acid has been admixed. The lifetime of such a battery equals that of conventional batteries which have negative plates with grids consisting of a lead-antimony-alloy and which require regular service such as periodical replacement of the water vaporized from the electrolyte.

The compressed compacts forming the separators of our novel battery precursor can be easily produced by compression with a pressure of from 1100 to 2800 psi.

BRIEF DESCRIPTION OF THE DRAWING

The drawing illustrates a single cell of the novel precursor of an electrical storage lead battery.

DESCRIPTION OF VARIOUS EMBODIMENTS OF THE INVENTION

The housing 1 of the single cell encases a pair of positive battery plates 2 interspersed between three negative battery plates 3 in spaced relationship. The positive plates 2 are interconnected by a pole bridge 4. The negative plates 3 are likewise interconnected by a pole bridge not shown.

The spaces between the plates 2 and 3 are completely filled by separators 5 which preferably are in intimate contact with the battery plates.

The separator 5 is a plate consisting of a densely compressed compact containing 70 to 100% of a material capable, when soaked with sulphuric acid, of forming a stiff gel and (b) 0 to 30% of fibres of glass or of any other acid-resistant and oxidation-resistant fibres. The housing 1 is provided with a conventional opening which is closed by a plug and upon removal thereof can be readily filled with the liquid electrolyte consisting primarily of sulphuric acid. In its dry and empty condition the housing 1 of the precursor has a practically unlimited shelf life. As the separator compacts 5 are rigid elements of considerable strength, our novel precursor is of a rugged structure capable of withstanding rough handling during assembly and transportation.

Preferred embodiments of the production of the separators will now be described.

90% by weight of finely divided silica of great purity produced by pyrolitical treatment of silicon tetrachloride available on the market per instance under the trade name "Aerosil 200" produced by Degussa and 10% by weight of fibres consisting of modacryl having a length of 3 mm and a thickness of 30 denier are thoroughly mixed in dry condition in a suitable high speed mixing apparatus. The mixture so formed is introduced into the container of a press and is compressed therein under a pressure amounting to 2150 psi to thereby form a flat separator plate. A quantity of 2 g of the mixture is sufficient to form a separator plate having an area of 4 square inch and a thickness of 0.079 inch. A separator compact of this type is capable of absorbing 6.5 g sulphuric acid of a density of 1.285 g per cm$^3$. The plates so formed are cut to rectangular separators assembled with positive plates and negative plates encased in a housing, the negative plates having grids free of antimony. The housing is so dimensioned that it keeps the separator plates in intimate contact with the positive and negative plates.

This precursor can be converted into a battery by filling the housing with 11.3 g of a mixture of 98% sulphuric acid having a density of 1.285 g per cm$^3$ and of 2% phosphoric acid. This quantity of liquid electrolyte filled into the housing is so dimensioned that the silica concentration in the gel formed by the separators will amount to about 15%. After the liquid electrolyte has been filled into the housing, a short period will expire until the electrolyte is completely absorbed by the separators so that the battery cannot lose any liquid acid when accidentally turned upside down or if the housing is fractured. The re-cycling life of this battery comprises 350 cycles, i.e. recharging operations after complete discharge. This life-time is about 5 times that of similar batteries with conventional separators and more than 10 times that of prior batteries of the type in which the liquid electrolyte is completely absorbed by the separators formed by fibrous mats of an acid-resistant material.

The battery produced from our novel precursor will supply electrical current immediately after the required quantity of electrolyte will have been filed into the housing.

In the foregoing the construction and operation of the illustrated exemplary embodiments of the invention have been described in considerable detail in order to ensure a complete understanding of the invention. However, it is to be understood that the invention is not limited to the particular application or to the details of construction of the illustrated embodiments and we desire to cover by the appended claims such other applications and modifications as do not depart from the true spirit and scope of our invention.

What we claim is:

1. In a precursor for an electrical storage lead battery the combination comprising a plurality of positive plates, a plurality of negative plates dispersed therebetween and of separator plates inserted between adjacent positive and negative plates, and a housing encasing said plates in dry condition, each of said separator plates consisting of a densely compressed compact containing
   (a) 70 to 100% of silica capable, when soaked with a liquid electrolyte, of forming a pressure-resistant gel,
   (b) 0 to 30% of acid-resistant and oxidation-resistant fibres,
said precursor being capable of being converted into an operative storage battery by introducing a liquid electrolyte containing sulphuric acid into said housing.

2. The combination claimed in claim 1 in which said separator plates fill the space between adjacent positive and negative plates.

3. The combination claimed in claim 1 in which said pulverized material is finely divided silicon-dioxide.

4. The combination claimed in claim 1 in which said fibres are substantially evenly distributed in said material.

5. The combination claimed in claim 1 in which said negative plates have grids consisting of a lead alloy free of antimony.

6. The combination claimed in claim 5 in which said lead alloy contains lead and calcium.

7. The combination claimed in claim 1 in which said electrolyte includes 0.5 to 5% phosphoric acid.

8. In a precursor for an electrical storage lead battery the combination comprising a plurality of positive plates, a plurality of negative plates dispersed therebetween and of separtor plates inserted between adjacent positive and negative plates, and a housing encasing said plates in dry condition, each of said separator plates consisting of a densely compressed compact containing
   (a) 70 to 97% silica capable, when soaked with a liquid electrolyte, of forming a pressure-resistant gel
   (b) 3 to 30% of acid-resistant and oxidation-resistant fibres, said precursor being capable of being converted into an operative storage battery by introducing a liquid electrolyte containing sulphuric acid into said housing.

9. The combination claimed in claim 8 in which said fibres have a length of from 2 to 10 mm and a thickness of from 1 to 10 denier.

* * * * *